Aug. 27, 1935.  W. H. SHUMAKER  2,012,358
TRIP MECHANISM FOR AUTOMOBILE ANTITHEFT SIGNAL DEVICES
Filed Jan. 13, 1934  2 Sheets-Sheet 1
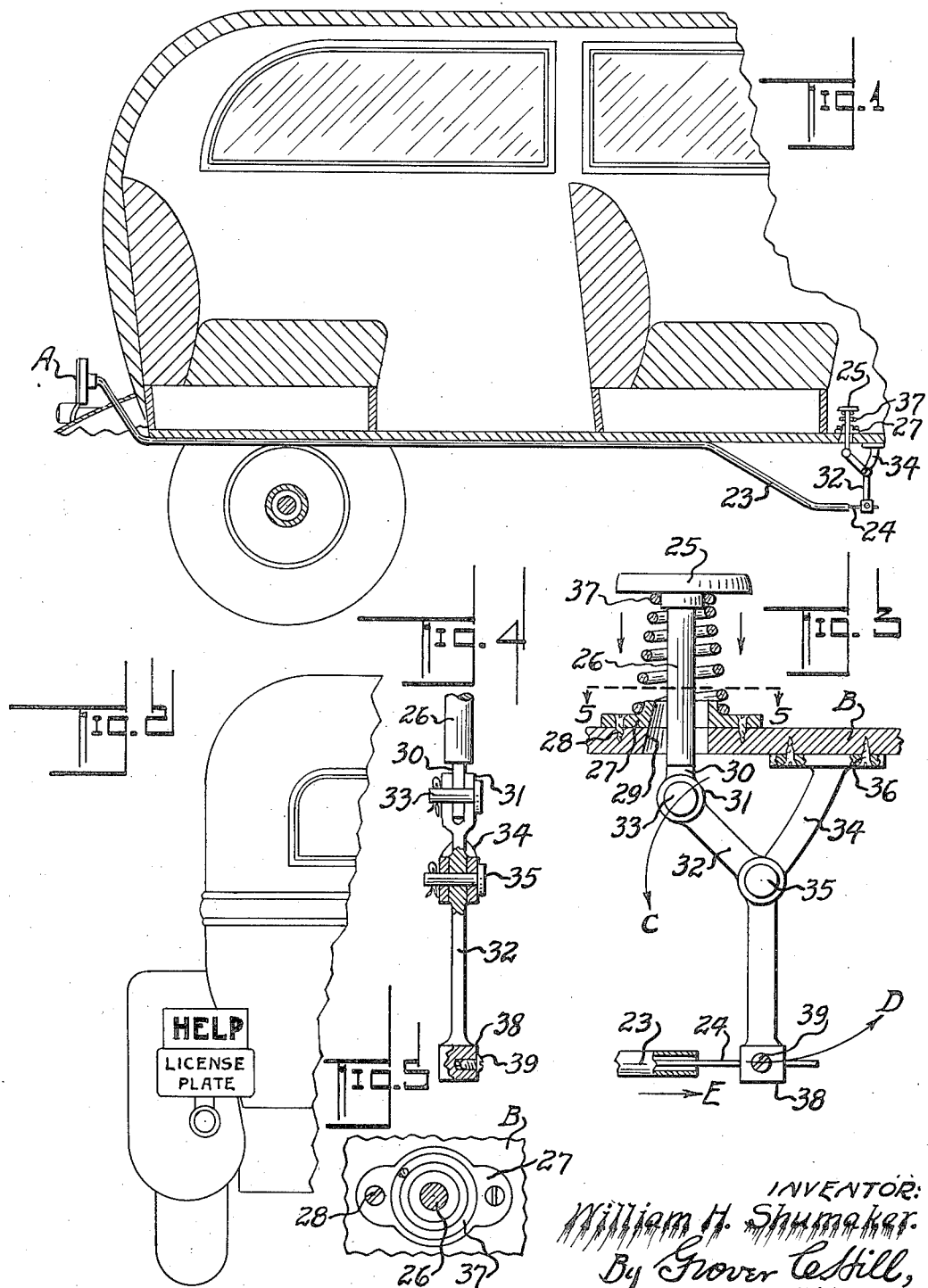

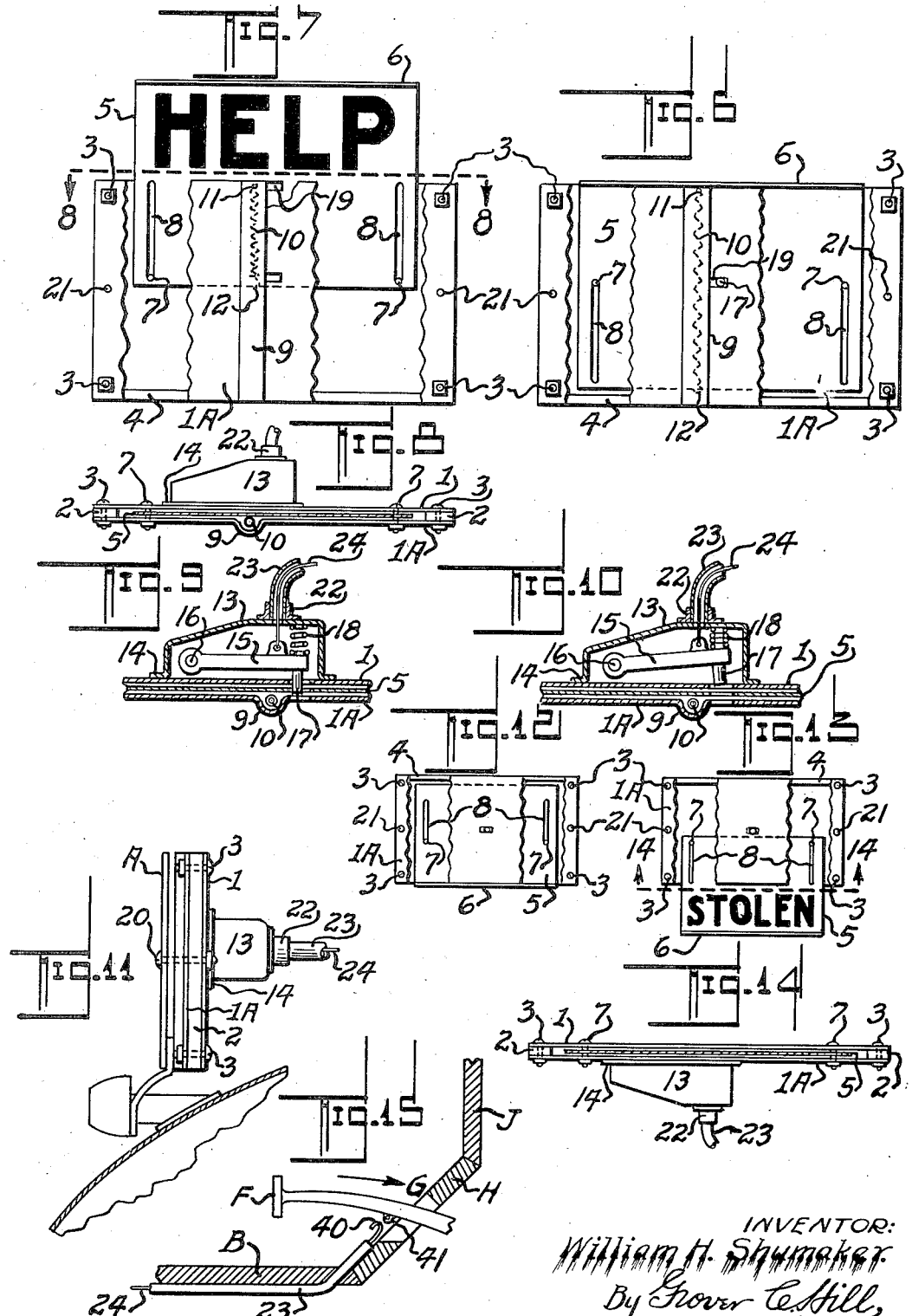

Patented Aug. 27, 1935

2,012,358

UNITED STATES PATENT OFFICE 2,012,358

TRIP MECHANISM FOR AUTOMOBILE ANTI-THEFT SIGNAL DEVICES

William H. Shumaker, Detroit, Mich.

Application January 13, 1934, Serial No. 706,572

1 Claim. (Cl. 116—33)

In the few years of late it is obviously a decided fact that automobile theft and particularly the use of the automobile as a means for kidnaping, has attained an alarming proportion. For this reason this invention was devised as an effective means to discourage such criminal practice and likewise to cause the culprits to be readily apprehended by law enforcing members at the very outstart of the contemplated crime.

This is accomplished by the provision of a metal case that is secured to the rear of the license plate and which is unnoticed when not in use. When the kidnaper directs the motorist to drive him to some secluded location, the motorist quickly depresses a pedal with his foot, and simultaneously with this operation a sign rises from the metal case in which it is inclosed, bearing the inscription, "Help" or a similar signal of distress.

The signal remains permanently visible, which will attract many persons and in this manner assistance would be available until an officer may be notified.

The particular advantage of the invention is not only to protect the occupants of the automobile, but to have the culprits promptly apprehended by law and due justice meted out to them.

A similar arrangement is provided whereby the automobile may be protected from theft by having the sign detachably connected to the clutch, so that when the car is started the forward motion of the clutch may cause the sign to instantly appear, bearing the inscription, "Stolen" or an appropriate word for the occasion.

It will be apparent during the course of the following detailed description that the invention possesses further advantages, illustrated throughout the drawings, and more specifically pointed out in the appended claim.

With reference to the drawings:

Figure 1 is a longitudinal section of a partial view of an automobile body, and showing the invention normally secured thereto.

Figure 2 is a partial rear view of an automobile showing the device in operation.

Figure 3 is an enlarged assembly of the trip mechanism of the device; the arrows therein indicate the direction of the motion of said mechanism.

Figure 4 is a partial side elevation and sectional assembly of the trip mechanism.

Figure 5 is a sectional view taken substantially upon line 5—5 of Figure 3.

Figure 6 is an elevation of the case partly broken away and showing the device normally inoperative.

Figure 7 is a similar view to Figure 6, showing the device in operation.

Figure 8 is a sectional plan view taken substantially upon line 8—8 of Figure 7.

Figure 9 is an enlarged section of the signal plate releasing mechanism, showing the same in the act of holding the signal plate, as indicated in Figure 6.

Figure 10 is a similar view to Figure 9, showing the mechanism having released the signal plate, as indicated in Figure 7.

Figure 11 is an end elevation of the case showing same normally secured to the license plate of the automobile.

Figure 12 is a reduced view of the invention in a modified form without the use of a spring and normally inoperative.

Figure 13 is a similar view to Figure 12, showing the signal plate having been discharged to a dropped position.

Figure 14 is an enlarged sectional view taken substantially upon line 14—14 of Figure 13.

Figure 15 is a sectional view of a modified form of the invention as it would be applied to an automobile clutch.

The invention comprises a case having metal sides 1 and 1A that are arranged in parallel relation as indicated. Disposed intermediate said sides and at the respective ends thereof are vertically arranged separator bars 2 that are secured to sides 1 and 1A by screws 3, also longitudinally arranged separator bar 4 intermediate said sides and at the bottom of the case.

Metal signal plate 5 is provided and having the top edge thereof deflected at right angles thereto as at 6, and it is noted that said plate is of somewhat smaller proportions than sides 1 and 1A of the case so that same may freely enter and depart from the case. A pair of guide screws 7 are provided which permit the outward and inward action of signal plate 5 by virtue of a similar number of elongated and vertically arranged slots 8 within said plate and respectively receiving said screws as indicated.

Vertically arranged pocket 9 is formed in side 1A so as to accommodate spring 10. One end of spring 10 is secured to the upper end of pocket 9 as at 11, and the opposite end thereof is secured to the lower edge of signal plate 5 as at 12.

An important feature of the device is the signal plate releasing mechanism, which consists of metal housing 13 having flange 14 which is adapted to be welded or otherwise suitably secured to side plate 1 where indicated. Within said housing is lever 15 that is pivotally secured at one end to said housing as at 16 and the opposite end of said lever has lug 17 formed thereon and spring 18 is interposed between this end of said lever and the inner surface of housing 13.

Signal plate 5 is provided with aperture 19 where indicated and lug 17 of lever 15 is adapted to freely engage said aperture when the device is normally inoperative as shown in Figure 9.

Referring to Figure 11 it is seen that the case of the device is secured to license plate A by means of screws 20, apertures 21 in said case being provided for receiving said screws.

Socket 22 is provided and secured to housing 13 where shown and is adapted to receive one end of tube 23, and said tube being for the purpose of accommodating wire 24.

With reference to Figure 3 the trip mechanism of the device is clearly shown and which comprises pedal 25 with elongated shank 26 formed thereon. Plate 27 is secured to floor board B of the automobile by screws 28, and it is noted that said plate has opening 29 of the shape as shown through which passes shank 26. The lower end of shank 26 is formed as at 30 and is adapted to engage yoke end 31 of bell crank lever 32 and is connected thereto by pin 33. Bell crank lever 32 is pivotally mounted upon bracket 34 by means of pin 35, and said bracket is connected to floor board B by screws 36. Coil spring 37 is interposed between pedal 25 and plate 27 as shown. The lower end of bell crank lever 32 is squared as at 38 and is provided with a threaded aperture adapted to receive screw 39 with an aperture at right angles to said screw for passage of wire 24. Said screw is for the purpose of locking the end of said wire with bell crank lever 32.

The complete details of construction of the major structure of the invention having been set forth the operation thereof immediately follows:

Pedal 25 is preferably located near the driver's seat in the front portion of the automobile, and is readily accessible to the driver who may operate same without being noticed by another occupant of the car. By depressing pedal 25 with the foot, with reference to Figure 3 it is understood that shank 26 will move the upper portion of bell crank lever 32 in the direction of arrow C and said lever being permanently pivoted to stationary bracket 34 the lower end 38 of said lever will move in the direction of arrow D, simultaneously drawing wire 24 in the direction of arrow E, and as said wire is carried through tube 23 to the rear of the car and with reference to Figures 9 and 10 is secured to lever 15 where shown, the wire moves this end of the lever thereby simultaneously disengaging lug 17 thereon from aperture 19 in signal plate 5, and by virtue of spring 10 said plate is instantly released from the case as clearly shown in Figures 7 and 10. As pedal 25 is released it is understood that plate 5 will remain in the exposed position and lever 15 will automatically return to the position with lug 17 adjacent the lower portion of plate 5 by reason of spring 18, and it is further understood that spring 37 will return pedal 25 to normal position upon the release of said pedal.

In order to set the device to a normally inoperative position, the operation consists simply of manually lowering plate 5 into the case whence aperture 19 therein will engage lug 17 of lever 15, and the device is again ready for operation.

The object of the modified form of the invention indicated in Figures 12 and 13 is to disclose the arrangement whereby a bracket secured to the fender is used for supporting the license plate from the top portion thereof, which is frequently used in automobile construction. In this condition said plate could not rise in view of the bracket, consequently it must descend so as to operate. In this arrangement the case and signal plate are identical with that of the major form with the exception of the spring 10 and pocket therefor 9, both of which are eliminated, however the signal plate releasing mechanism as shown in Figures 9 and 10 is retained in its original form with aperture 19 within plate 5 for this purpose. In this arrangement when pedal 25 is depressed lever 15 releases plate 5 and said plate drops to the position as shown in Figure 13 by reason of gravity. Plate 5 is restored to an inoperative position by manually elevating same into the case where it likewise engages lugs 17 of lever 15 and is retained thereby.

The invention may be as advantageously applied for purpose of protecting the automobile from theft, and by referring to Figure 15 it will be observed that in this arrangement pedal 25 and the trip mechanism coordinated with the same are eliminated and the end portion of the tube 23 is deflected and passes upwardly through floor board B, and the end of wire 24 projects outwardly of said tube and forms a hook as at 40. When the automobile is in use by the owner or any authorized person, the device is inoperative as indicated in Figure 15, and upon leaving the car such person attaches wire 24 to clutch F by connecting hook 40 with lug 41 of said clutch. It is now understood that when clutch F is actuated after this connection is made the device will be operated in view of wire 24 being drawn in the direction of the clutch or arrow G in this view.

The entire signal releasing mechanism as shown in Figures 9 and 10 will remain identical with the mechanism used in the preferred form of the device and operates in the same manner. For this method it would be preferable to have an inscription upon signal plate 5 bear the word, "Stolen" or of course any appropriate word for the purpose. It is further understood that either system of signal operation shown in Figures 6 and 7 or in Figures 12 and 13, may be successfully used. In Figure 15 it is seen that the customary toe board H and dash J are visible.

A further important advantage of the invention is that while the primary intention thereof is for the purpose of protecting the occupants of the automobile from the terrible act of the kidnapper and hold-up men, and likewise to protect the automobile from theft, the identical arrangement may be as advantageously used for installation in stores, or in any similar places requiring the protection effected by the use of this device.

It may be further added that an important advantage is attained in view of the extreme simplicity in construction and operation of the invention and being likewise very substantial, it should endure for an indefinite period, and also may be manufactured and sold at a price consistent with the keeping of the lowest possible cost to the consumer.

While a preferred embodiment of the major structure of the invention is herein set forth, it is understood that the same is susceptible to certain minor changes in the details of construction, in the event that conditions warrant changes during any probable further development of the device for the market.

Having thus described my invention, what I claim as new is:

In an automobile anti-theft device, a case having separated sides with the ends and bottom thereof inclosed and having an open top, a signal plate slidably disposed within said case, said plate having an aperture therein, a signal plate releasing mechanism and a housing therefor secured to the aforesaid case, said mechanism comprising a lever pivotally mounted at one end in said housing and having at its opposite end a lug positioned to enter the aforesaid aperture in the signal plate, a spring interposed between the rear of the actuating end of said lever and the inner surface of the aforesaid housing, a lug formed upon the rear of said lever, an operatively disposed cable for the device, one end of said cable permanently engaging said lug, said cable passing out through an opening within said housing.

WILLIAM H. SHUMAKER.